(12) United States Patent
Yoshikawa et al.

(10) Patent No.: US 7,920,385 B2
(45) Date of Patent: *Apr. 5, 2011

(54) TERMINAL BOX FOR SOLAR CELL MODULE

(75) Inventors: Hiroyuki Yoshikawa, Yokkaichi (JP); Makoto Higashikozono, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 523 days.

This patent is subject to a terminal disclaimer.

(21) Appl. No.: 12/084,436

(22) PCT Filed: Sep. 5, 2006

(86) PCT No.: PCT/JP2006/317509
§ 371 (c)(1),
(2), (4) Date: May 1, 2008

(87) PCT Pub. No.: WO2007/055062
PCT Pub. Date: May 18, 2007

(65) Prior Publication Data
US 2009/0086444 A1    Apr. 2, 2009

(30) Foreign Application Priority Data
Nov. 9, 2005   (JP) ................. 2005-325175

(51) Int. Cl.
*H01L 31/042* (2006.01)
*H01L 31/048* (2006.01)

(52) U.S. Cl. ............. 361/752; 361/641; 136/244

(58) Field of Classification Search .......... 361/641, 361/642, 752; 136/243–245, 251
See application file for complete search history.

(56) References Cited

U.S. PATENT DOCUMENTS

| 4,567,316 | A  | * | 1/1986  | Hollaus et al. ............. 136/246 |
| 6,696,636 | B2 | * | 2/2004  | Yoshikawa et al. ........... 136/244 |
| 7,365,965 | B2 | * | 4/2008  | Higashikozono et al. .... 361/641 |
| 7,369,398 | B2 | * | 5/2008  | Higashikozono et al. .... 361/641 |
| 7,723,609 | B2 | * | 5/2010  | Yoshikawa et al. ........... 136/244 |
| 2005/0236031 | A1 | * | 10/2005 | Higashikozono et al. .... 136/251 |
| 2005/0268958 | A1 | * | 12/2005 | Aoyama ..................... 136/244 |
| 2008/0011348 | A1 | * | 1/2008  | Aoyama et al. .............. 136/244 |

FOREIGN PATENT DOCUMENTS

| JP | 11-251614   | 9/1999  |
| JP | 2000-299485 | 10/2000 |
| JP | 2004-063651 | 2/2004  |
| JP | 3498945     | 2/2004  |
| JP | 3664312     | 6/2005  |

* cited by examiner

*Primary Examiner* — Jinhee J Lee
*Assistant Examiner* — Nathan Milakovich
(74) *Attorney, Agent, or Firm* — Gerald E. Hespos; Michael J. Porco

(57) ABSTRACT

A plurality of terminal boards (30A, 30B) for electrically interconnecting a plus electrode and a minus electrode of a solar cell module and cables (90) for external connection corresponding to the both electrodes are placed on a base plate (11), and two corresponding terminal boards (30A, 30B) are bridged by a bypass diode (50). The respective terminal boards (30A, 30B) juxtaposed on the top surface of the base plate (11) are collectively supported and fixed by a retaining plate (60). Accordingly, the generation of an undue strain in the bypass diode (50) can be avoided even in the case of fixing the terminal boards (30A, 30B) to the base plate (11) with the terminal boards (30A, 30B) bridged by the bypass diode (50) beforehand.

6 Claims, 4 Drawing Sheets

TERMINAL BOX FOR SOLAR CELL MODULE

BACKGROUND OF THE INVENTION

1. Field of the Invention

The present invention relates to a terminal box for solar cell module.

2. Description of the Related Art

A solar photovoltaic system is so constructed as to supply direct currents from a solar cell panel laid on the roof of a house or building to electrical goods via an inverter or the like. The solar cell panel is comprised of a plurality of solar cell modules, and electrodes of the respective solar cell modules are connected in series or in parallel via terminal boxes.

A known terminal box is such that a pair of terminal boards are juxtaposed on a base plate forming the bottom of a box main body, a plus electrode and a minus electrode drawn from the underside of the solar cell module are connected with one ends of the both terminal boards, and ends of cables for external connection are connected with the other ends of the both terminal boards (see, for example, Japanese Patent No. 348945). A bypass diode for reverse flow/short circuit bridges the two terminal boards. This bypass diode is constructed such that two conductive pieces extend in opposite directions with a bare chip interposed therebetween and the extending ends thereof are connected with the corresponding terminal boards by soldering. Further, each terminal board is formed with a hole, and the teeth of an inner clip washer provided on the inner periphery of this hole are caused to bite in a projection standing on the base plate, whereby each terminal board is individually fixed to the base plate.

If an attempt is made to fix the both terminal boards to the base plate with the bypass diode connected between the two terminal boards, the other terminal board is in a free state together with the bypass diode while one terminal board is fixed. Thus, there has been a possibility that an undue strain is generated in a connecting part of the bypass diode and the terminal board and the bypass diode is deformed or disconnected from the terminal board. Particularly, if an attempt is made to connect the bypass diode to the terminal boards by reflow soldering, the connecting operation of the bypass diode has to be finished before the both terminal boards are fixed to the base plate. Thus, the strain acting on the bypass diode considerably increases according to the above method, wherefore a solution to it has been strived for.

The present invention was completed in view of the above situation and an object thereof is to reduce a strain which will act on a bypass diode at the time of fixing two terminal boards.

SUMMARY OF THE INVENTION

The invention is directed to a terminal box for solar cell module, comprising a plurality of terminal boards for electrically interconnecting a plus electrode and a minus electrode of a solar cell module and cables for external connection corresponding to the both electrodes. The terminal boards are juxtaposed on a base plate. A bypass rectifying element at the time of a reverse load bridges two adjacent terminal boards. A retaining plate is fixed to the base plate while pressing the respective terminal boards connected with the rectifying element toward the base plate. The retaining plate collectively sandwiches only the respective terminal boards together with the base plate by pressing the rectifying element over the entire circumference.

The retaining plate preferably is formed with an escaping hole, into which the rectifying element is insertable, at a position corresponding to the rectifying element. According to this construction, the rectifying element can be seen through the escaping hole.

The respective terminal boards preferably are accommodated in a box main body constructed to include the base plate, and the retaining plate is fixed to the base plate by the resilient engagement of a locking piece provided at the peripheral edge of the retaining plate with an interlocking portion provided on a side plate standing up from the peripheral edge of the base plate. According to this construction, when the retaining plate is placed in the box main body and pushed toward the base plate, it is fixed to the base plate upon the resilient engagement of the locking piece of the retaining plate with the interlocking portion of the side plate integral to the base plate, with the result that only the terminal boards are collectively sandwiched between the retaining plate and the base plate.

An opening preferably is formed at an end position of the base plate, and connected parts of the terminal boards with the plus electrode or minus electrode of the solar cell module are located in the opening. This construction is convenient in the case of connecting the plus or minus electrode of the solar cell module with the connecting portion of the terminal board by soldering.

The respective terminal boards preferably are accommodated in a box main body constructed to include the base plate, a cover is mounted on the box main body, and the retaining plate is formed separately from the cover. According to this construction, it becomes possible to sandwich the respective terminal boards between the retaining plate and the base plate before the cover is mounted and to provide sealing by introducing an insulating resin into the box main body in this state.

The respective terminal boards preferably are accommodated in a box main body constructed to include the base plate, a cover is mounted on the box main body, and the retaining plate is integrally formed with the cover. Since the retaining plate is integrally formed with the cover, the number of parts can be reduced. This is useful in the case of introducing no insulating resin into the box main body.

Since the respective terminal boards are bridged by the rectifying element, an undue strain might act on the rectifying element to affect a rectifying function if an attempt is made to fix the respective terminal boards to the base plate with the rectifying element connected with the terminal boards beforehand. However, according to the present invention, the relative positions of the respective terminal boards can be substantially immovably kept upon fixing the terminal boards to the base plate and the concentration of the strain on the rectifying element can be avoided since the retaining plate for collectively fixing the terminal boards juxtaposed on the top surface of the base plate by sandwiching them is provided.

Further, by using the retaining plate, the respective terminal boards can be aligned in a flat manner by a relatively simple method, thereby improving assembling operability. By increasing the pressing force of the retaining plate against the terminal boards, the terminal boards can be more closely held in contact with the base plate. Therefore, upon the heat generation of the rectifying element, heat can be efficiently radiated from the terminal boards to the base plate.

DETAILED DESCRIPTION OF THE PREFERRED EMBODIMENT

One embodiment of the invention is described with reference to FIGS. 1 to 6. A terminal box for solar cell module of this embodiment is mounted on the underside of a solar cell module having a multitude of solar battery cells connected with each other in series, and provided with a box-shaped box main body 10, a multitude of terminal boards 30A, 30B arranged in parallel in this box main body 10 and a plurality of bypass diodes 50 (corresponding to a "bypass rectifying element at the time of a reverse load" of the present invention) bridging the adjacent terminal boards 30A, 30B.

Figure 1:
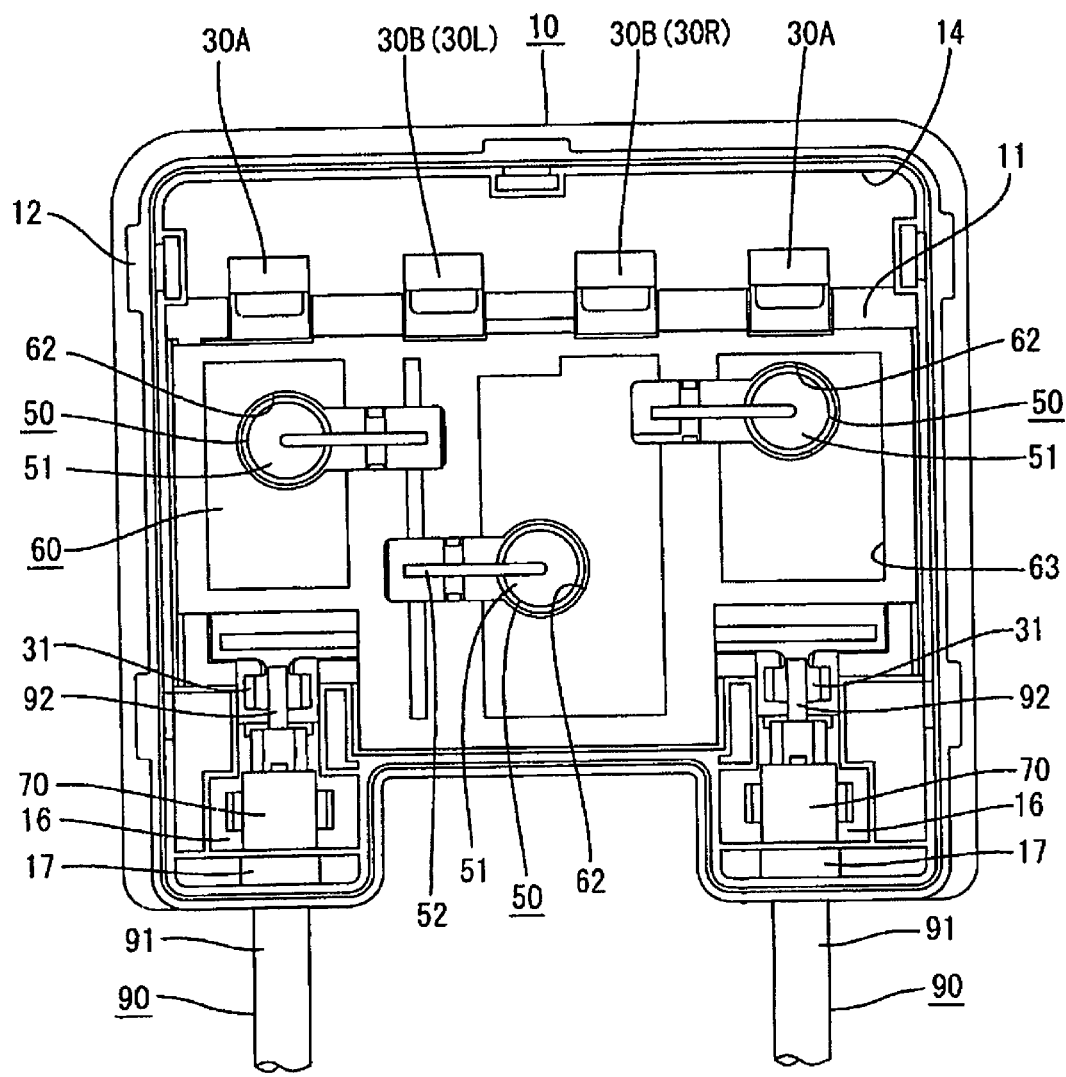
FIG. 1 is a plan view of the interior of a box main body of a terminal box according to one embodiment of the invention.
Figure 2:
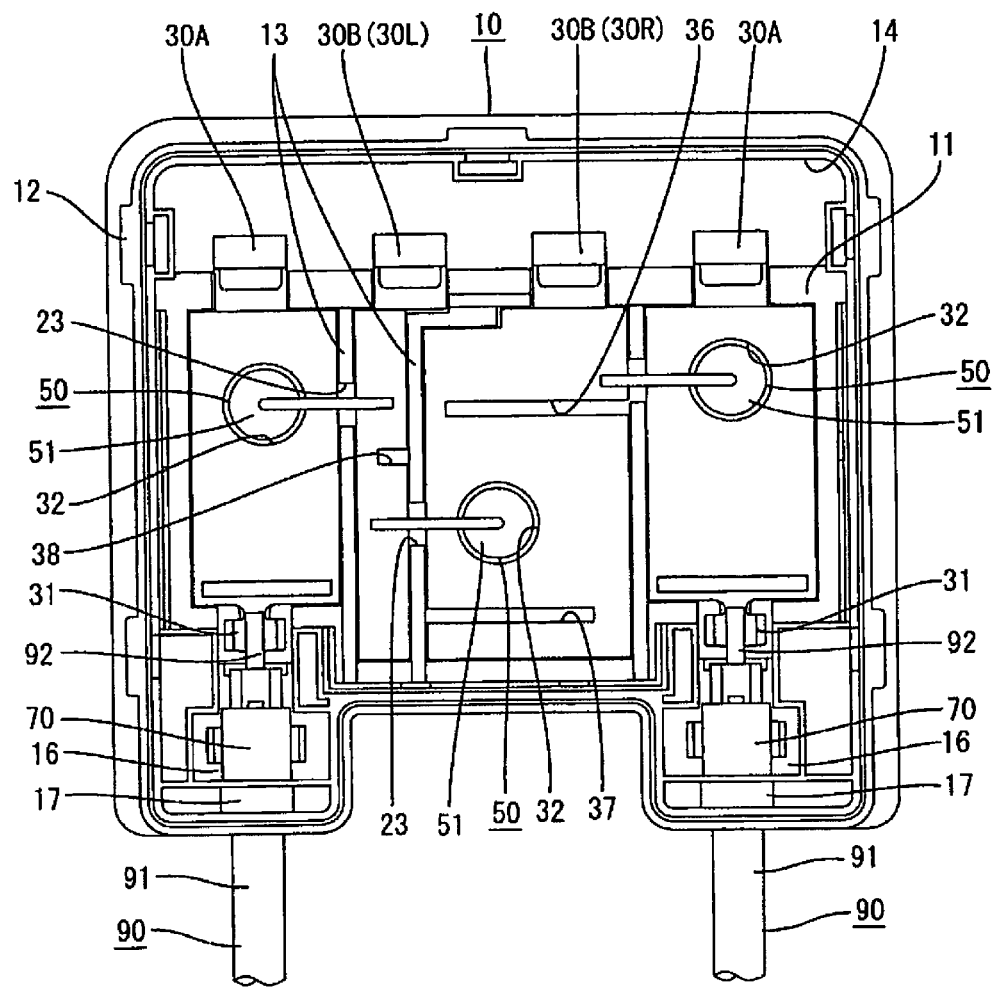
FIG. 2 is a plan view of the interior of the box main body before a cover is mounted.
Figure 3:
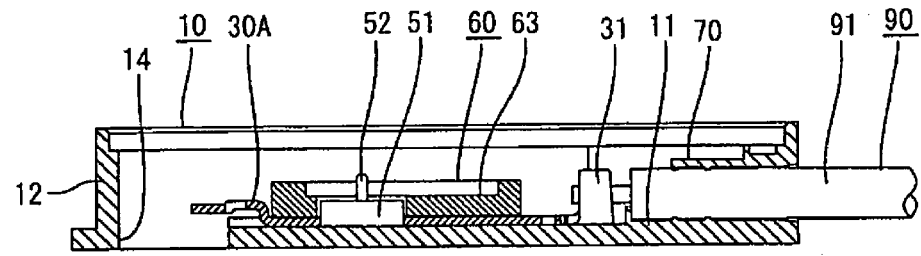
FIG. 3 is a section of the interior of the box main body cut along the longitudinal direction of a cable.

The box main body 10 is made of synthetic resin and has a box shape with an open upper side. An insulating resin material (potting material) is introduced into the box main body 10 and a cover (not shown) is mounted from above. More specifically, as shown in FIGS. 1 and 2, the box main body 10 includes a substantially rectangular base plate 11 on which a plurality of terminal boards 30A, 30B are placed side by side, a substantially rectangular side plate 12 standing up from the peripheral edge of the base plate 11 to surround, and partition walls 13 standing up at specified positions on the base plate 11 to partition between the adjacent terminal boards 30A, 30B. Out of the box main body 10, an insulating resin is so filled into spaces partitioned by the partition walls 13 as to adhere to the respective terminal boards 30A, 30B, and a filled amount of the insulating resin can be reduced by as much as an amount corresponding to the thicknesses of the partition walls 13.

An opening 14 is formed to extend over the entire width at one end of the base plate 11, and the leading ends of the respective terminal boards 30A, 30B are located in this opening 14. Leads (not shown) corresponding to the respective solar battery cell groups are introduced through the opening 14 of the base plate 11, and the respective introduced leads can be connected with the leading ends of the corresponding terminal boards 30A, 30B, for example, by soldering. Further, a retaining plate 60 separate from the box main body 10 and the cover is so mounted on the base plate 11 to traverse above the respective terminal boards 30A, 30B in width direction.

Figure 4:
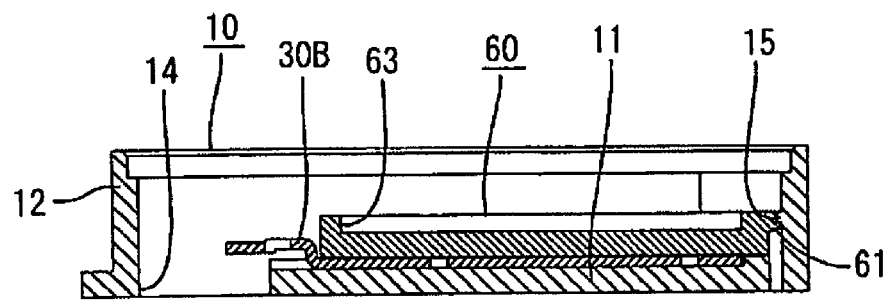
FIG. 4 is a section of the interior of the box main body cut in a widthwise center.

The retaining plate 60 is made of synthetic resin to be wide, and prevents upward movements of the respective terminal boards 30A, 30B and the action of physical strains on the bypass diodes 50 bridging the respective terminal boards 30A, 30B at the time of fixing the terminal boards 30A, 30B by being pressed against the base plate 11 from above to collectively fix the respective terminal boards 30A, 30B. Specifically, the retaining plate 60 covers the respective terminal boards 30A, 30B except their connection areas with the leads and their connection areas with the cables 90, and locking pieces 61 engageable with interlocking portions 15 of the side plate 12 are formed to project at a plurality of positions of the periphery of the retaining plate 60. As shown in FIG. 4, by the resilient engagement of the locking pieces 61 with the interlocking portions 15, the respective terminal boards 30A, 30B are held between the retaining plate 60 and the base plate 11.

As the retaining plate 60 is pressed, the respective terminal boards 30A, 30B and the base plate 11 are closely held in contact without defining any clearances therebetween and heat generated by the bypass diodes 50 is efficiently radiated from the terminal board 30A, 30B to the base plate 11. The retaining plate 60 is formed with escaping holes 62 substantially extending along the outer edges of the bypass diodes 50 at positions corresponding to the bypass diodes 50, and the bypass diodes 50 are inserted into these escaping holes 62 so as to be visible from above. Recesses 63 for preventing sink marks during the molding are formed at suitable positions of the upper surface of the retaining plate 60.

Figure 5:
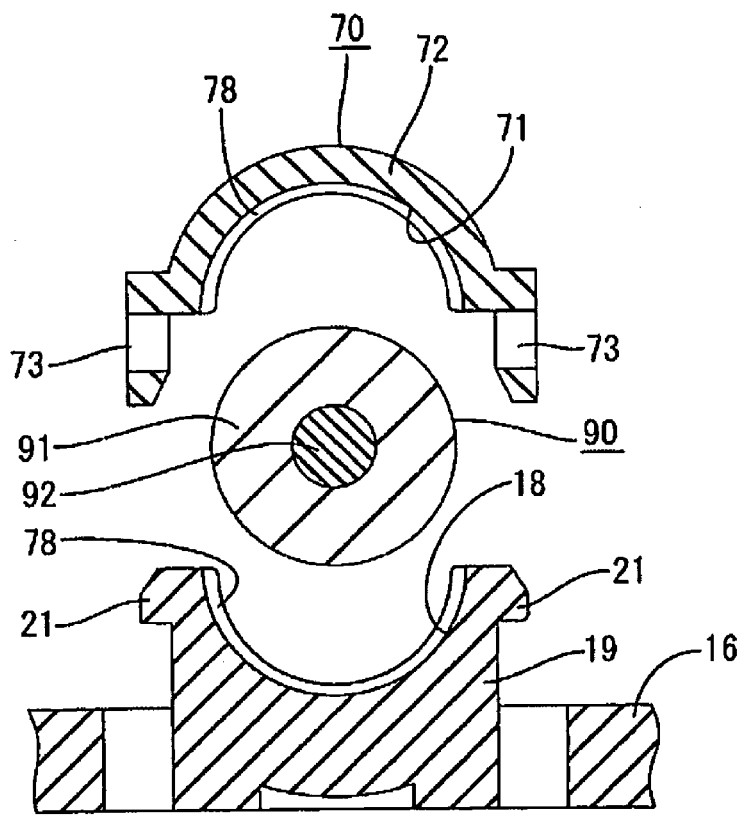
FIG. 5 is a section before the cable is placed on a cable placing surface.
Figure 6:
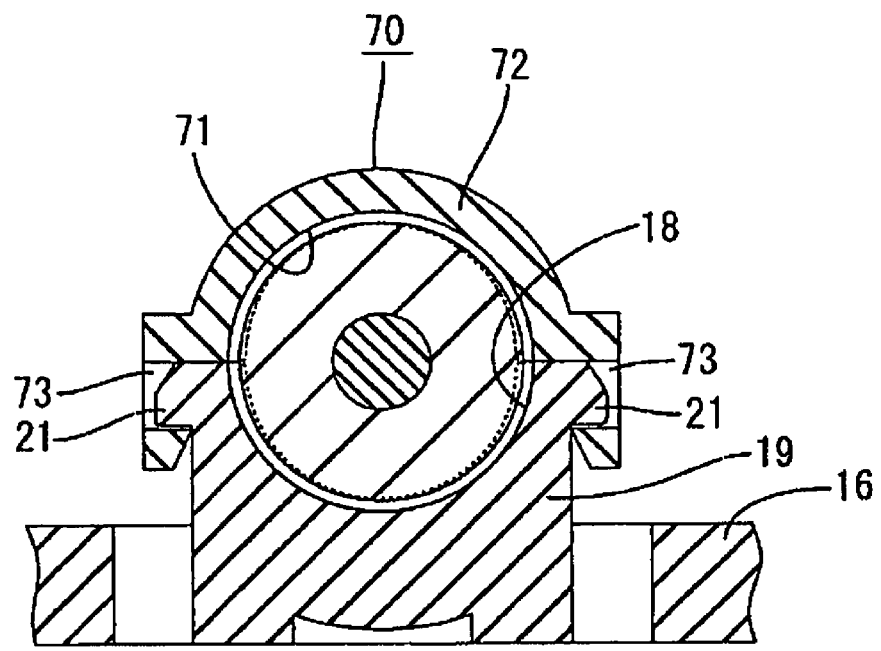
FIG. 6 is a section showing a state where the cable is held between a cable pressing surface and a cable receiving surface.

At the opposite widthwise ends of the other end of the base plate 11, cable placing portions 16, on which cables 90 for external output are to be placed, are formed to extend in longitudinal direction. The side plate 12 surrounding the cable placing portions 16 is bent at the opposite ends to have a substantially crank shape, and tubular portions 17 formed with cable insertion holes, through which the cables 90 can be loosely passed, extend in longitudinal direction in these bent parts. As shown in FIG. 5, each cable placing portion 16 is formed with a supporting portion 19 having a substantially semicylindrical cable receiving surface 18 in conformity with the lower half of the cable 90, and a pair of engaging portions 21 project from the opposite side surfaces of the supporting portion 19.

A cable pressing member 70 is mounted on the cable 90 placed on the cable receiving surface 18 from above. The cable pressing member 70 includes a pressing main body 72 having a substantially semicylindrical cable pressing surface 71 in conformity with the upper half of the cable 90 and a pair of lock pieces 73 resiliently deformably formed at the opposite ends of the pressing main body 72. The both lock pieces 73 are resiliently engaged with the engaging portions 21 with the supporting portion 19 located therebetween, whereby the cable pressing surface 71 and the cable receiving surface 18 are combined to have a substantially circular shape and sandwich the cable 91 therebetween, with the result that the cable 91 is fixed to the base plate 11. A plurality of ribs 78 are formed in circumferential direction on each of the cable pressing surface 71 and the cable receiving surface 18, and these ribs 78 bite in an insulation coating 91 of the cable 90 to provide hermetic sealing between the cable 90 and the base plate 11 and between the cable 90 and the cable pressing member 70. Since the cable pressing member 70 and the tubular portion 17 are arranged side by side in the extending direction of the cable 90, the tubular portion 17 acts to prevent shaking movements of the cable 90. Thus, even if the cable 90 is shaken in a direction intersecting with the longitudinal direction thereof, vibration is unlikely to be transmitted to the cable pressing member 70, so that the sealing performance of the cable pressing member 70 can be maintained over the long term.

The terminal boards 30A, 30B are formed into strips by, for example, cutting an electrically conductive metal plate material, and four terminal boards are juxtaposed along the outer surface (top surface) of the base plate 11. Out of the respective terminal boards 30A, 30B, two located at the opposite ends in an arranging direction serve as cable connecting terminals 30A to be crimped into connection with the cables 90 for extracting electromotive forces from the respective solar battery cell groups. The insulation coating 91 is stripped off at an end of each cable 90 to expose a core 92, and a pair of barrel portions 31 formed at an end of the cable connecting terminal 30A are crimped or soldered into connection with the exposed core 92. An intermediate area of each cable connecting terminal 30A is formed wider than the connection area with the lead and the barrel portions 31, and a principal body 51 of the bypass diode 50 is supported in this intermediate area. A connection hole 32, into which the principal body 51 is fitted for connection, is formed to penetrate the intermediate area of the cable connecting terminal 30A. By forming this intermediate area wider, a heat radiating property at the time of heat generation of the principal body 51 is improved.

Out of the respective terminal boards 30A, 30B, two located in the middle in the arranging direction serve as intermediate connecting terminals 30B arranged between the two cable connecting terminals 30A. Out of these intermediate connecting terminals 30B, one intermediate connecting terminal 30R (shown right terminal board) supports the principal body 51 of the bypass diode 50 and the other intermediate connecting terminal 30L (shown left terminal board) supports no principal body 51 and is connected with the leading ends of connecting pins 52 (to be described later) extending from the principal bodies 51 supported by the terminal boards located at the opposite sides (cable connecting terminal 30A and one intermediate connecting terminal 30R). A connection hole 32, into which the principal body 51 is fitted for connection, is likewise formed to penetrate the one intermediate connecting terminal 30R supporting the principal body 51, and the intermediate area of this intermediate connecting terminal 30R is formed wider than the other intermediate connecting terminal 30L in order to improve the heat radiating property. Specifically, the intermediate area of the one intermediate connecting terminal 30R is formed to project toward the other intermediate connecting terminal 30L and, accordingly, the intermediate area of the other intermediate connecting terminal 30L is displaced in width direction from the connection area with the lead to have a stepped shape. The respective terminal boards 30A, 30B are partitioned by the partition walls 13. The partition wall 13 arranged between the one intermediate connecting terminal 30R and the other intermediate connecting terminal 30L is bent along the projecting part of the one intermediate connecting terminal 30R. Each partition wall 13 is formed with a cutout 23, through which the connecting pin 52 of the bypass diode 50 passes, so as to be able to avoid the interference with the connecting pin 52.

The principal bodies 51 of the three bypass diodes 50 supported by the two cable connecting terminals 30A and the one intermediate connecting terminal 30R are displaced from positions on a straight line extending in the arranging direction of the respective terminal boards 30A, 30B. The intermediate connecting terminals 30B are formed with heat insulating portions 36, 37, 38 for dividing heat radiating areas of the respective bypass diodes 50 into a plurality of areas. Each of these heat insulating portions 36, 37, 38 is a slit-shaped air layer extending in width direction and making an opening in one lateral edge of the intermediate connecting terminal 30B. Two heat insulating portions are formed in the one intermediate connecting terminal 30R, and one is formed in the other intermediate connecting terminal 30L. Specifically, the one intermediate connecting terminal 30R is cut at a position near the opening 14 to form a first heat insulating layer 36 having such a depth as to make an opening in the right edge and reach a position in the vicinity of the left edge, and a second insulating layer 37 having such a depth as to make an opening in the left edge and reach a position in the vicinity of the right edge is formed at a position at a side of the bypass diode 50 opposite to the first insulating layer 36. Further, the other intermediate connecting terminal 30L is cut between the leading ends of the two placed and connected connecting pins 52 to form a third heat insulating layer 38 having such a depth as to make an opening in the right edge and reach a substantially middle part with respect to width direction. Heat generated by the bypass diodes 50 is efficiently radiated from the corresponding terminal boards 30A, 30B to the base plate 11 while going by way of these heat insulating layers 36, 37, 38.

The bypass diode 50 roughly includes the principal body 51 having a flat cylindrical shape and the bendable connecting pin 52 drawn out from the substantial center of one end surface of the principal body 51. The principal body 51 is such that a lateral side of an unillustrated chip diode comprised of a P-area (anode area) and an N-area (cathode area) is surrounded by a metallic cylindrical member and a bottom portion (either the anode area or the cathode area) of the chip diode is held in contact with a bottom portion of the cylindrical member to establish an electrical connection while an insulating resin is filled between the cylindrical member excluding this bottom portion and the chip diode, wherefore the principal body 51 is formed into a small-size package as a whole. A multitude of unillustrated sawtooth-shaped recesses and projections are formed in longitudinal direction in the circumferential surface of the principal body 51 (circumferential surface of the cylindrical member) and bite in the edge of the connection hole 32 of the terminal board 30A, 30B, whereby the bypass diode 50 can be easily and reliably supported in the corresponding terminal board 30A, 30R while being prevented from rotating.

The connecting pin 52 of the bypass diode 50 is electrically connected with the top surface (either the cathode area or the anode area) of the chip diode while the base end thereof is embedded in the principal body 51. Specifically, the connecting pin 52 is arranged to bridge the terminal board 30A, 30R supporting the principal body 51 and the adjacent terminal board 30B, is bent on the top surface of the chip diode to extent substantially horizontally toward the adjacent terminal board 30B and then bent downward, has the bottom end thereof further bent to extend along the upper surface of the adjacent terminal board 30B, and has resistance welding or soldering welding applied to the leading end thereof to be connected with this adjacent terminal board 30B.

In this embodiment, one principal body 51 of the bypass diode 50 is supported on each of the two cable connecting terminals 30A and one principal body 51 of the bypass diode 50 is supported on the one intermediate connecting terminal 30R as described above. Out of these bypass diodes 50, one bypass diode 50 is formed such that the P-side (anode side) and the N-side (cathode side) have polarities opposite to those of the two remaining bypass diode 50. More specifically, the connecting pin 52 of the bypass diode 50 bridging the cable connecting terminal 30A arranged at the left side and the other intermediate connecting terminal 30L is drawn out from the N-side (cathode side) of the principal body 51 supported on this cable connecting terminal 30A to have a N-polarity. The connecting pin 52 of the bypass diode 50 bridging the cable connecting terminal 30A arranged at the right side and the one intermediate connecting terminal 30R is drawn out from the P-side (anode side) of the principal body 51 supported on this cable connecting terminal 30A to have a P-polarity, and the connecting pin 52 of the bypass diode 50 bridging the one intermediate connecting terminal 30R and the other intermediate connecting terminal 30L is drawn out from the P-side (anode side) of the principal body 51 supported on the one intermediate connecting terminal 30R to have a P-polarity. Accordingly, by using the other intermediate connecting terminal 30L as an auxiliary intermediate terminal to be connected with the leading ends of the two connecting pins 52, the principal bodies 51 of the bypass diodes 50 can be supported on the both cable connecting terminals 30A while the bypass diodes 50 are connected in series.

Next, functions and effects of this embodiment are described. First of all, the principal bodies 51 of the bypass diodes 50 are pressed into the respective connection holes 32 of the both cable connecting terminals 30A and the one intermediate connecting terminal 30R, and the leading ends of the connecting pins 52 are placed on the adjacent terminal boards (other intermediate connecting terminal 30L and one intermediate connecting terminal 30R) and connected by resistance welding or soldering welding. Subsequently, the respective terminal boards 30A, 30B connected via the above bypass diodes 50 are placed at specified positions on the base plate 11, and the retaining plate 60 is mounted on the terminal boards 30A, 30B from above. In this state, the retaining plate 60 is pressed toward the base plate 11 to engage the locking pieces 61 of the retaining plate 60 with the interlocking portions 15 of the side plate 12, thereby fixing the retaining plate 60 to the box main body 10. Then, the respective terminal boards 30A, 30B are collectively held in a flat state between the retaining plate 60 and the base plate 11 to adhere to the base plate 11, wherefore upward movements thereof from the base plate 11 can be reliably prevented.

Subsequently, the cables 90 for external output are inserted through the cable introducing holes of the tubular portions 17, the cores 92 of the cables 90 located in the box main body 10 after passing through the tubular portion 17 are placed on the barrel portions 31 of the cable connecting terminals 30A, and the barrel portions 31 of the cable connecting terminals 30A are crimped or soldered into connection with the cores 92 of these cables 90. Then, the cable pressing members 70 are mounted on the insulation coatings 91 of the cables 90 and the lock pieces 73 of the cable pressing members 70 are engaged with the engaging portions 21, whereby sealing is given to the cables 90. As a result, water entrance through the cable introducing holes is prevented.

Thereafter, the base plate 11 of the box main body 10 is fixed to the solar cell module by means of adhesive, double-sided adhesive tape or bolts. In the mounting process, the leads connected with the electrodes of the solar cell module are drawn into the box main body 10 through the opening 14 of the base plate 11 and the leading ends of the leads are soldered into connection with the leading ends of the corresponding terminal boards 30A, 30B. Subsequently, the insulating resin such as a silicon resin is filled into the box main body 10 to hermetically seal the bypass diodes 50 with the insulating resin entering the escaping holes 62 of the retaining plate 60, and hermetically seals the connected parts of the terminal boards 30A, 30B with the leads and the connected parts of the cable connecting terminals 30A with the cables 90. Finally, the cover is mounted to close the opening in the upper surface of the box main body 10, thereby completing the assembling operation.

As described above, according to this embodiment, the retaining plate 60 collectively supports and fixes the respective terminal boards 30A, 30B juxtaposed on the top surface of the base plate 11 in the case of fixing the terminal boards 30A, 30B to the base plate 11 with the terminal boards 30A, 30B bridged by the connecting pins 52 of the bypass diodes 50 beforehand. Thus, the respective terminal boards 30A, 30B can be substantially immovably held upon being fixed to the base plate 11, thereby being able to avoid a situation where undue strains are generated in the connecting pins 52 of the bypass diodes 50.

Further, since the respective terminal boards 30A, 30B are held in close contact with the base plate 11 by the action of a pressing force from the retaining plate 60, the heat generated by the bypass diodes 50 can be efficiently radiated from the terminal boards 30A, 30B to the base plate 11.

The present invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

According to the present invention, the respective terminal boards may be supported on and fixed to the top surface of the base plate by means of adhesive by applying the adhesive to the terminal board placing surfaces of the base plate, placing the terminal boards connected with the bypass diodes on these placing surfaces and pressing a pressing jig against all the terminal boards from above.

According to the present invention, the interior of the box main body may not be sealed with the insulating resin. In such a case, the retaining plate may be integrally mounted on the underside of the cover, whereby the number of parts can be reduced.

A known package diode or a bare chip diode comprised of a bare chip and a conductive piece may be used as the bypass diode.

The terminal boards may include only cable connecting terminals, and the two cable connecting terminals may be bridged by the bypass diode to be shorted.

What is claimed is:

1. A terminal box for a solar cell module, comprising:
    a plurality of terminal boards for electrically interconnecting a plus electrode and a minus electrode of the solar cell module and cables for external connection corresponding to the both electrodes,
    a base plate, on which the terminal boards are juxtaposed,
    a bypass rectifying element bridging two adjacent terminal boards for a reverse load, and
    a retaining plate fixed to the base plate,
    wherein:
    the rectifying element comprises a principle body having a flat cylindrical shape, and
    the retaining plate is fixed to the base plate while pressing the rectifying element and the respective terminal boards connected with the rectifying element toward the base plate, and collectively sandwiches only the respective terminal boards together with the base plate by pressing the rectifying element over the entire circumference of the principle body of the rectifying element.

2. A terminal box for solar battery module according to claim 1, wherein the retaining plate is formed with an escaping hole, into which the rectifying element is insertable, at a position corresponding to the rectifying element.

3. A terminal box for solar battery module according to claim 1, wherein:
    the respective terminal boards are accommodated in a box main body constructed to include the base plate, and
    the retaining plate is fixed to the base plate by the resilient engagement of a locking piece provided at the peripheral edge of the retaining plate with an interlocking portion provided on a side plate standing up from the peripheral edge of the base plate.

4. A terminal box for solar battery module according to claim 1, wherein:
    an opening is formed at an end position of the base plate, and
    connected parts of the terminal boards with the plus electrode or minus electrode of the solar cell module are located in the opening.

5. A terminal box for solar battery module according claim 1, wherein:

the respective terminal boards are accommodated in a box main body constructed to include the base plate,
a cover is mounted on the box main body, and
the retaining plate is formed separately from the cover.

6. A terminal box for solar battery module according to claim 1, wherein:
the respective terminal boards are accommodated in a box main body constructed to include the base plate,
a cover is mounted on the box main body, and
the retaining plate is integrally formed with the cover.

* * * * *